United States Patent

Yamashita

[11] Patent Number: 5,943,622
[45] Date of Patent: Aug. 24, 1999

[54] MOBILE RADIO COMMUNICATION SYSTEM AND AUTOMATIC FREQUENCY ALLOCATION METHOD

[75] Inventor: Tetsuya Yamashita, Tokyo, Japan

[73] Assignee: NEC Corporation, Tokyo, Japan

[21] Appl. No.: 08/881,004

[22] Filed: Jun. 23, 1997

[30] Foreign Application Priority Data

Jun. 24, 1996 [JP] Japan .................................... 8-163120

[51] Int. Cl.[6] .................................................. H04Q 7/28
[52] U.S. Cl. ........................... 455/509; 455/450; 455/452
[58] Field of Search .................... 455/450, 452, 455/454, 62, 63, 447, 434, 513, 514, 509

[56] References Cited

U.S. PATENT DOCUMENTS

| | | | |
|---|---|---|---|
| 5,258,980 | 11/1993 | Maebara et al. | 370/347 |
| 5,386,588 | 1/1995 | Yasuda | 455/423 |
| 5,666,399 | 9/1997 | Bales et al. | 455/419 |
| 5,787,344 | 7/1998 | Scheinert | 455/422 |
| 5,864,759 | 1/1999 | Tat | 455/437 |

*Primary Examiner*—Wellington Chin
*Assistant Examiner*—Congvan Tran
*Attorney, Agent, or Firm*—Sughrue, Mion, Zinn Macpeak & Seas, PLLC

[57] ABSTRACT

A mobile radio communication system which autonomously performs frequency allocation and changing for optimum system operation without intervention of a system designer and an operation maintenance engineer. The mobile radio communication system includes radio base stations which communicate by radio with mobile stations and an operation maintenance station which supervises and controls an operation situation of the system. Each of the radio base stations includes reception electric field strength measurement means for measuring reception electric field strengths of the channels of the radio base station, and the operation maintenance station discriminates, from installation position information of the radio base stations and a cluster radius, those radio base stations to which allocation of the same channel as that of a predetermined radio base station is to be inhibited, and allocates a usable channel based on reception electric field strengths measured by the predetermined base station and reception electric field strengths measured by the radio base stations to which allocation of the same channel is inhibited. The operation maintenance means further performs, when there is a radio base station which uses a channel in which the speech quality is lower than a required quality, channel changing or allocating a channel other than the channel in which the speech quality is lower than the require quality.

5 Claims, 3 Drawing Sheets

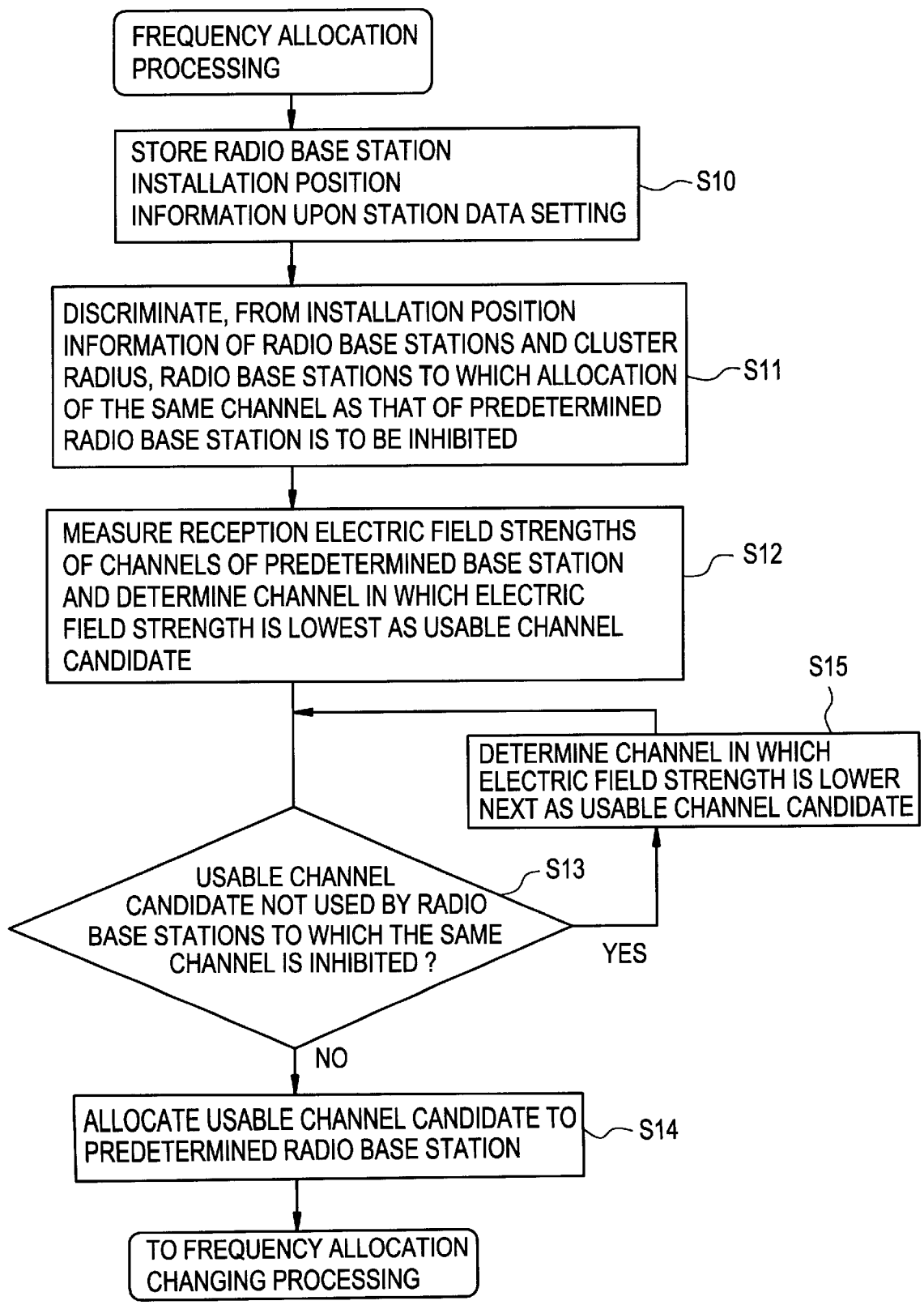

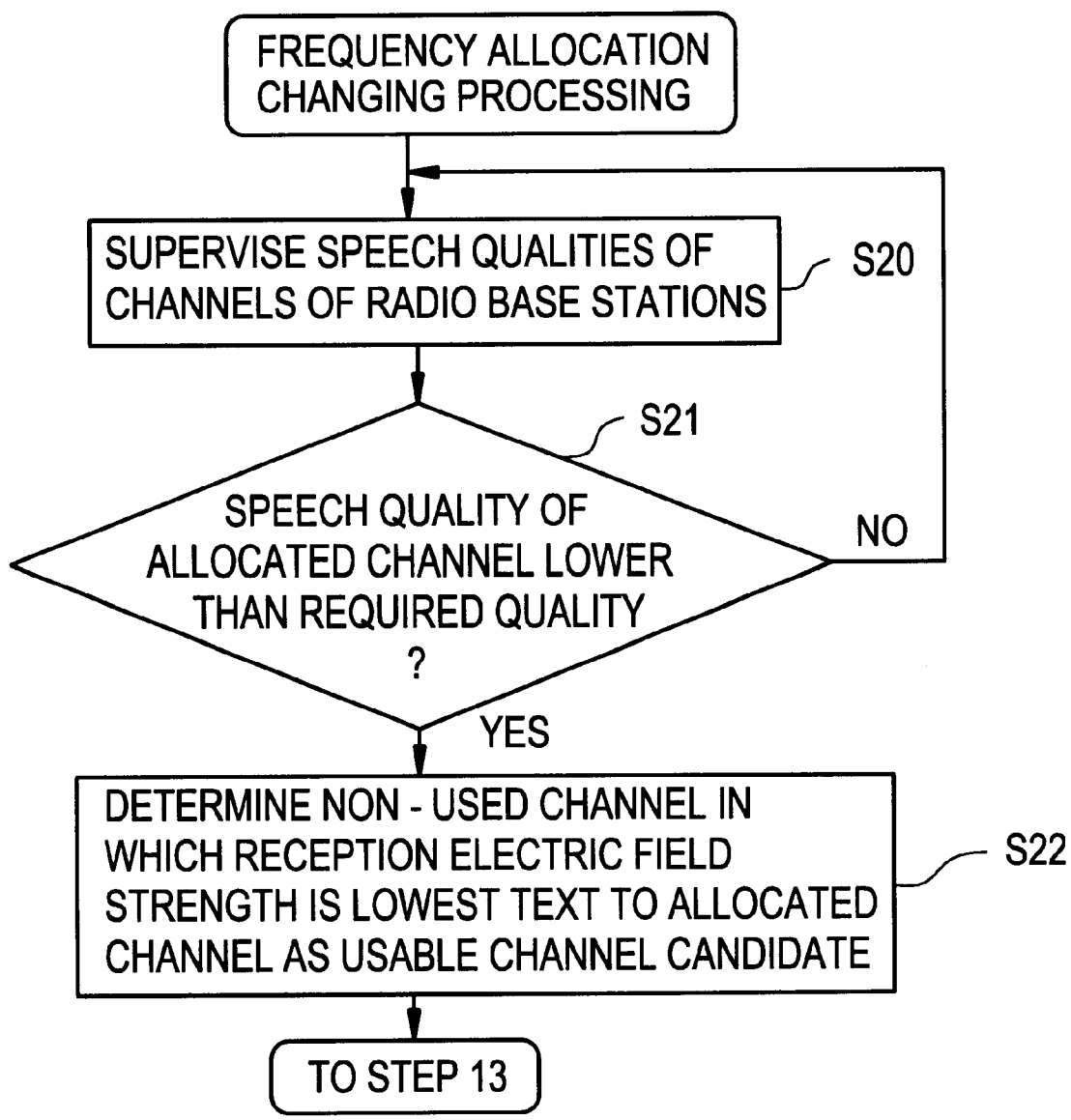

MOBILE RADIO COMMUNICATION SYSTEM AND AUTOMATIC FREQUENCY ALLOCATION METHOD

BACKGROUND OF THE INVENTION

1. Field of the Invention:

This invention relates to a mobile radio communication system which includes a plurality of mobile stations, a plurality of radio base stations communicating with the mobile stations using a plurality of channels of different frequencies and having specific radio areas, and an operation maintenance station which supervises and controls an operation situation of the system and wherein the same channel can be allocated to a plurality of radio base stations and an automatic frequency allocation method performed in the system.

2. Description of the Prior Art:

In a mobile radio communication system, each radio base station having a specific radio area called a cell must be allocated channels for all the transmitter-receivers in the cell from the limited number of frequencies (channels) authorized for use. In using this limited number of frequencies to accommodate the largest number of subscribers and process the maximum number of cells, there is a method of allocating the same channel in the same system to different radio base station.

In such a case, when the same channel in the same system is used simultaneously by a plurality of proximate radio base stations, the same frequency used by another station causes interference and the quality of a cell deteriorates. Due to this disturbance, in system designing, allocation of channels (radio frequency allocation) must be performed so that the same channel can be utilized efficiently and interference between channels is minimized.

In recent years, mobile radio communication systems have become remarkably large in scale, and systems have been constructed which consist of hundreds of base stations. In radio frequency allocation for such a large scale mobile radio communication system, it is very difficult to design a precise system in a short time based on the desk judgment of a designer, because the number of factors to be taken into consideration in designing and the amount of data to be handled are very large.

In this regard, a method of performing radio frequency allocation by computer simulation has been proposed. For example, a method is available which seeks to allocate radio frequencies by simulation under fixed assumptive conditions, and also an attempt to enter actual system operation situations and radio speech quality data into a simulation system to raise the simulation accuracy has been performed.

Meanwhile, as a frequency allocation method which does not use a simulation system, an automatic frequency allocation method has been proposed wherein communication carrier frequencies used by other base stations are monitored to detect whether or not a communication carrier frequency is used commonly by a base station and the other base stations and, if a communication carrier frequency which is used commonly by any of the other base stations is detected, then the communication carrier frequency of the base station is re-selected thereby to change the communication carrier frequency of the base station to prevent interference with the other base stations (refer to Japanese Patent Laid-Open Application No. Heisei 4-68925).

However, with the method described above wherein radio frequency allocation is performed by simulation, since a radio frequency allocation obtained is a result of the simulation obtained under the fixed assumptive conditions and does not reflect an actual operation situation, it is not an optimum radio frequency allocation.

Also where an actual system operation situation and radio speech quality data are entered into a simulation system, there is a problem in that the amount of data to be collected is very large and much time is required for their collection and an operation situation of the system which varies from time to time cannot be followed up. Further, there is another problem in that, since measurement data include errors and fluctuations for each measurement, the radio communication situations obtained from results of the measurements are not fixed and simulation cannot achieve convergence to an optimum solution or a real solution. Consequently, the method described above still fails to introduce a normally optimum radio frequency allocation following up a situation of the system.

Further, where simulation is used, since it does not involve autonomous judgment of whether or not a set radio frequency allocation is optimum, it is required for a system operator to supervise the system operation situation from time to time and discriminate from the operation situation and a radio speech quality situation whether or not the radio frequency allocation need be changed.

With the automatic frequency allocation method disclosed in Japanese Patent Laid-Open Application No. Heisei 4-68925, although frequency allocation can be performed automatically on an actual system so that interference with a different base station may not occur, since the same channel is not used by different stations in the system, the method is not suitable for a mobile radio communication system which re-allocates the same channel in the same system.

SUMMARY OF THE INVENTION

It is an object of the present invention to provide a mobile radio communication system and a method of automatic frequency allocation whereby an identical channel in the same system can be used by different base stations and optimum frequency allocation can be done without the need of a system designer or an operation maintenance engineer.

In order to attain the object described above, according to an aspect of the present invention, a mobile radio communication system which includes a plurality of mobile stations, a plurality of radio base stations which communicate by radio with said plurality of mobile stations using a plurality of channels of different frequencies, and an operation maintenance station which monitors and controls the operation situation of said system and wherein the same channel can be allocated to a plurality of said radio base stations, wherein each of said radio base stations includes reception electric field strength measurement means for measuring reception electric field strengths of the channels of the radio base station, and said operation maintenance station includes same channel allocation inhibition discrimination means for discriminating, from installation position information of said radio base stations set in advance and a cluster radius determined from a required desired-to-undesired signal ratio, those radio base stations to which allocation of the same channel as that of a predetermined one of said plurality of radio base stations is to be inhibited, and usable channel allocation means for allocating a usable channel to the predetermined base station based on reception electric field strengths of the channels measured by the predetermined base station and reception electric field strengths of the channels measured by the radio base stations to which allocation of the same channel is inhibited by said same channel allocation inhibition discrimination means.

The mobile radio communication system described above may be constructed such that said operation maintenance means further includes speech quality monitoring means for monitoring speech qualities between said mobile terminals and said plurality of radio base stations, and quality discrimination means for discriminating based on a result of the supervision of said speech quality supervision means whether or not there is a radio base station which is using a channel in which the communication quality is lower than a required quality, and said usable channel allocation means allocates, to a radio base station discriminated by said quality discrimination means which is using a channel in which the speech quality is lower than the required quality, a channel other than the channel in which the speech quality is lower than the required quality.

According to the present invention, a first automatic frequency allocation method performed in a mobile radio communication system which includes a plurality of mobile stations, a plurality of radio base stations which communicate by radio with said plurality of mobile stations using a plurality of channels of different frequencies, and an operation maintenance station for supervising and controlling an operation situation of said system and wherein the same channel can be allocated to a plurality of said radio base stations, comprises the steps of:

measuring reception electric field strengths of channels of the radio base station;

discriminating, from installation position information of said radio base stations set in advance and a cluster radius determined from a required desired-to-undesired signal ratio, those radio base stations with which allocation of the same channel as that of a predetermined one of said plurality of radio base stations is to be inhibited; and allocating a usable channel to the predetermined base station based on reception electric field strengths of the channels measured by the predetermined base station and reception electric field strengths of the channels measured by the radio base stations with which allocation of the same channel is inhibited.

The automatic frequency allocation method described above may be constructed such that the allocation of the usable channel is performed such that it is confirmed for each of the channels of the predetermined radio base station successively in an ascending order of the electric field strength whether or not the channel is being used by the radio base stations to which allocation of the same channel is inhibited, and the channel which is first confirmed as the channel is not being used is determined as a usable channel.

According to the present invention, a second automatic frequency allocation method performed in a mobile radio communication system which includes a plurality of mobile stations, a plurality of radio base stations which communicate by radio with said plurality of mobile stations using a plurality of channels of different frequencies, and an operation maintenance station for supervising and controlling an operation situation of said system and wherein the same channel can be allocated to a plurality of ones of said radio base stations, comprises the steps of:

measuring reception electric field strengths of channels of the radio base station;

discriminating, from installation position information of said radio base stations set in advance and a cluster radius determined from a required desired-to-undesired signal ratio, those radio base stations with which allocation of the same channel as that of a predetermined one of said plurality of radio base stations is to be inhibited; and confirming for each of the channels of the predetermined radio base station successively in an ascending order of the electric field strength whether or not the channel is being used by the radio base stations to which allocation of the same channel is inhibited when a usable channel is allocated to the predetermined base station based on reception of electric field strengths of the channels measured by the radio base stations to which allocation of the same channel is inhibited;

determining as a usable channel the channel which is first confirmed as the channel is not being used;

confirming whether or not the speech quality of radio communication by the allocated channel is lower than required quality; and allowing the one of the other channels which has an electric field strength which is next lower than the allocated channel and which is not currently being used to become the allocated channel if the speech quality of the allocated channel is lower than the required quality.

According to the present invention described above, since radio frequency allocation is performed based on data under actual operation environments on an actual system, resulting radio frequency allocations reflect the actual operation situation of the system.

Further, since the radio frequency allocation is performed autonomously in the system, a system designer does not intervene in the radio frequency allocation.

Furthermore, where the speech quality of radio communication by the allocated channel is lower than the required quality, since a channel with which the electric field strength is lower next to the allocated channel and which is not currently being used is allocated, an optimum radio frequency allocation following up the operation situation of the system can be introduced without intervention of an operation maintenance engineer.

According to the present invention described above, since radio frequency allocation is performed autonomously on the actual system, a mobile communication system and an automatic frequency allocation method by which radio frequency allocation which reflects the system operation situation can be performed without intervention of a system designer can be provided.

Further, in the invention wherein, when the communication quality of radio communication by the allocated channel is lower than the required quality, a channel in which the electric field strength is lower next to the allocated channel and which is not used is allocated, radio frequency allocation following up the operation situation of the system can be performed without intervention of an operation maintenance engineer, and consequently, there is an effect that the operation maintenance engineer is not required to discriminate whether or not it is necessary to change the radio communication allocation.

BRIEF DESCRIPTION OF THE DRAWINGS

In the accompanying drawings:

FIG. 2 is a flow chart illustrating a procedure of frequency allocation processing; and FIG. 3 is a flow chart illustrating a procedure of frequency allocation changing processing.

DESCRIPTION OF THE PREFERRED EMBODIMENT(S)

An embodiment of the present invention is described below with reference to the drawings.

Figure 1A:
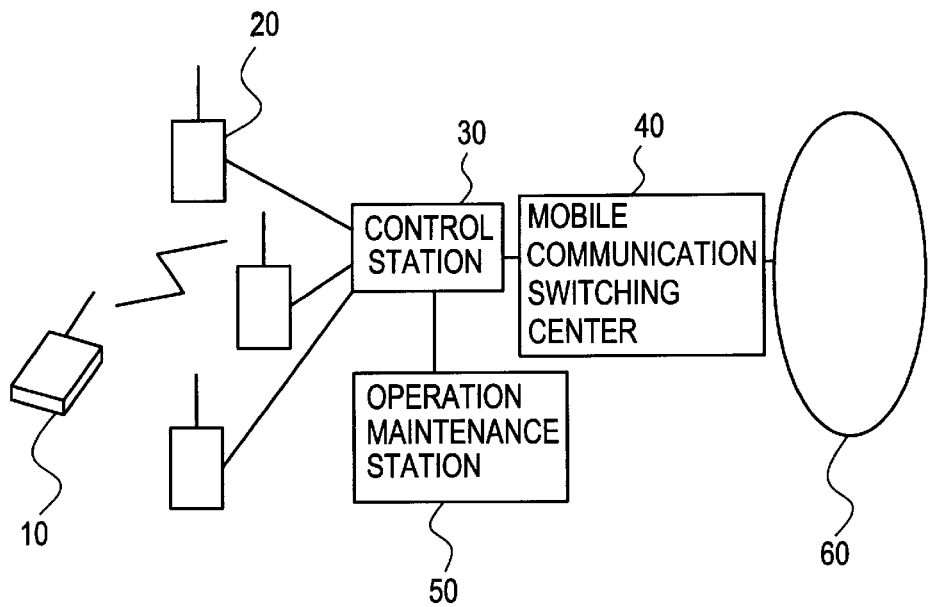
FIG. 1(a) is a block diagram showing an outline of a mobile radio communication system of an embodiment of the present invention.
Figure 1B:
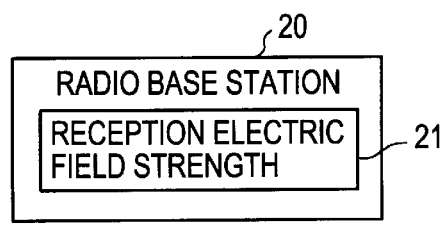
FIG. 1(b) is a block diagram showing an example of a construction of a radio base station.
Figure 1C:
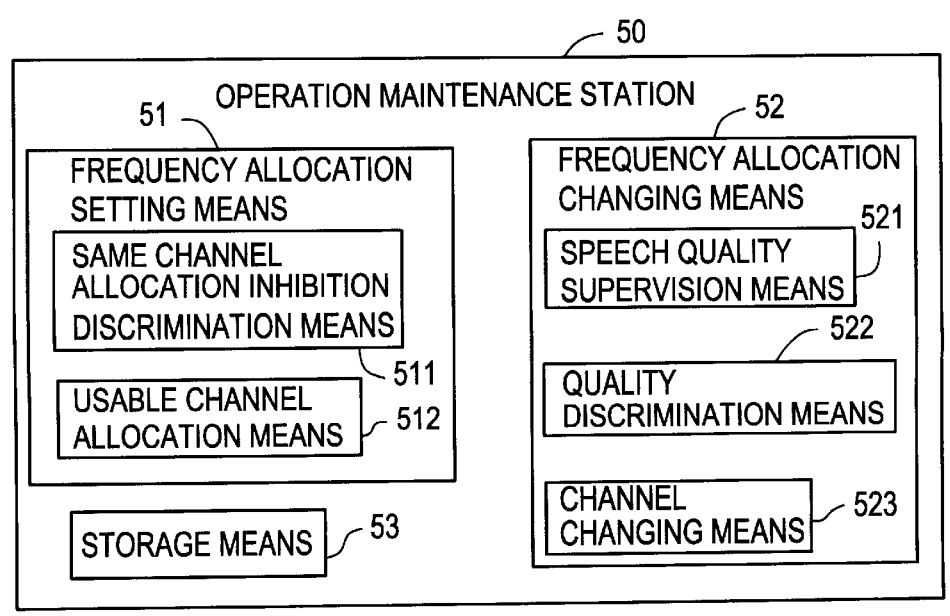
FIG. 1(c) is a block diagram showing an example of a construction of an operation maintenance station.

FIGS. 1(a) to 1(c) are block diagrams showing a mobile radio communication system of the present invention. FIG. 1(a) is a block diagram showing an outline of the mobile radio communication system of the embodiment of the present invention, FIG. 1(b) is a block diagram showing an example of a construction of a radio base station, and FIG. 1(c) is a block diagram showing an example of a construction of an operation maintenance station.

Referring to FIG. 1(a), the mobile radio communication system includes mobile terminal 10 allocated to each subscriber, radio base stations (BTSs) 20 which communicate with mobile terminals 10 by radio, control station 30 for controlling radio base stations 20, mobile communication switching center 40 which performs call processing in the system and connection processing to public telephone switch network 60, and operation maintenance station 50 which supervises an operation situation of the system and performs maintenance and control of the system.

As shown in FIG. 1(b), each of radio base stations 20 includes reception electric field strength measurement means 21 for measuring a reception electric field strength of each of all channels which can be used in the system. The reception electric field strength of each channel measured by reception electric field strength measurement means 21 is transmitted to operation maintenance station 50.

As shown in FIG. 1(c), operation maintenance station 50 includes frequency allocation setting means 51 for performing frequency allocation, frequency allocation changing means 52 for changing the set frequency allocation based on an operation situation, and storage means 53 for storing the system operation situation, radio base station installation position information (for example, information of installation positions each represented by a latitude and a longitude) and information of the reception electric field strength and so forth of each channel transmitted from each radio base station 20.

Frequency allocation setting means 51 includes same channel allocation inhibition discrimination means 511 which discriminates BTSs to which allocation of the same channel as that of a base station to which a channel is to be allocated is to be inhibited from cluster radius D determined from a required CIR (Carrier to Interference Ratio) and radio base station installation position information, and usable channel allocation means 512 which allocates a usable channel based on reception electric field strengths of individual channels of the base station to which a channel is to be allocated and reception electric field strengths of the individual channels measured by same channel allocation inhibition BTSs set in regard to the base station.

Frequency allocation changing means 52 includes speech quality supervision means 521 for supervising speech qualities between mobile terminal 10 and radio base stations 20, quality discrimination means 522 for discriminating, based on a result of tabulation of supervisory data after each interval of time, whether or not there is a radio base station which is using a channel in which the speech quality is lower than a required quality, and channel changing means 523 for changing, for a radio base station which is using a channel in which the speech quality is lower than the required quality, the channel.

In the mobile radio communication system having the construction described above, frequency allocation to the radio base stations by frequency allocation setting means 51 and changing of the frequency allocations to the base stations in response to a system operation situation which is performed by frequency allocation changing means 52 after the frequency allocation is performed are performed. In the following, operation of the present system is described in detail separately for processing regarding the frequency allocation and processing regarding the changing of frequency allocations. For description of the processing regarding the frequency allocation, FIG. 2 is referred to, and for description of the processing regarding the changing of frequency allocations, FIG. 3 is referred to.

1. Processing Regarding Frequency Allocation

In the present mobile radio communication system, when station data is set for operation maintenance station 50, which is done when setting the radio base stations, radio base station installation position information is stored as attribute values of radio base stations 20 in storage means 53 (step 10).

Then, which BTSs have a positional relationship with a BTS0 to which the same channel must not be allocated is calculated from the position information stored in storage means 53 in accordance with the following procedure by same channel allocation inhibition discrimination means 511.

For all radio base stations BTS, distances R between individual base stations BTSi to BTSj ($i \neq j$, $i \geq 1$, $j \leq N$) are calculated, and a (N)×(N) matrix A whose elements are Rij is produced. Then, necessary cluster radius D is calculated from a required CIR, and from r0j of the matrix A, BTSj which satisfy r0j < D are searched out to detect those radio base stations BTS to which a channel the same as the channel to be set to the BTS0 cannot be allocated (step 11). The same channel allocation inhibition BTSs obtained in this manner are stored into storage means 53.

After the same channel arrangement inhibition BTSs with regard to the BTS0 are obtained, a reception electric field strength of each of all channels which can be used in the system by the BTS0 is measured, and results of the measurement are transmitted to operation maintenance station 50 and stored into storage means 53.

After the reception electric field strengths of all channels of the BTS0 are measured, a channel whose electric field strength is lowest among the measured reception electric field strengths is selected as a usable channel candidate by usable channel allocation means 512 (step 12). Then, it is checked whether or not the usable channel candidate is being used by any of the BTSs with which the same channel allocation discriminated for the BTS0 described above is used (step 13). If the usable channel candidate is not used, then the usable channel candidate is allocated as a channel usable by the BTS0 (step 14). If the usable channel candidate is used, then the usable channel candidate is determined to be non-usable, and a channel whose reception electric field strength is next lowest is selected as a usable channel candidate (step 15). Then, similar discrimination of whether or not the usable channel candidate is used in any of the BTSs within the same channel allocation inhibition range is performed. This processing is performed repetitively until a channel which is not being used is detected. It is to be noted that, when a usable channel candidate is selected in an ascending order of the reception electric field strength, it is assumed that each measurement reception electric field strength includes a measurement error of a fixed width and any channel in which the intensity difference is within the error range is received with the same strength. Since data to be used for discrimination and determination of frequency allocations are used for processing of comparison discrimination and so forth on the assumption that the data include a fixed amount of errors and fluctuations in advance therein, the influence of insignificant fluctuations in data for each measurement on the present processing can be minimized.

Frequency allocation setting means 51 performs processing similar to that of the allocation of channels to the BTS0 described above for all BTSs.

2. Changing of Frequency Allocations

When frequency allocation is performed and the system operates, speech qualities of the channels of the ratio base stations are monitored by speech quality monitoring means 521 (step 20). More particularly, radio speech qualities during communication are supervised based on results of the data measurement of the speech quality deterioration ratio from the terminals and the BTSs, and the speech qualities of the channels of the radio base stations are tabulated and stored. The tabulation result may be stored in storage means 53 or another storage means (RAM).

Then, it is discriminated from a speech quality supervision tabulation result of speech quality supervision means 521 after each fixed interval of time by quality discrimination means 522 whether or not there is a BTS which is using a channel with which a situation wherein the speech quality is lower than a required quality although the reception electric field strength is sufficiently high occurs in a frequency higher than an allowable range (step 21).

If there is a BTS which is using a channel with which the speech quality is lower than the required quality, channel changing means 523 notifies the BTS that the channel in which the speech quality is lower than the required quality is not suitable to be used by the BTS, and allocates, in place of the channel which is not suitable to be used, another channel in which the electric field strength is next lowest from among the reception electric fields measured by the BTS (step 22). For this channel changing, processing similar to the channel allocation processing performed by usable channel allocation means 512 described above is performed. It is to be noted that, while, in the present embodiment, the channel changing (channel allocation) is performed by channel changing means 523, it may otherwise be performed by usable channel allocation means 512 described above. In particular, usable channel allocation means 512 may allocate, to a radio base station which uses a channel with which the speech quality is lower than the required quality as a result of discrimination of quality discrimination means 522, a channel other than the channel with which the speech quality is lower than the required quality.

It is to be noted that, while, in the foregoing description, allocation of the same channel to base stations in the neighborhood is described, the present invention is not limited to this, and frequency allocation may be performed so that disturbing waves may not be produced over a frequency range including the same channel and neighboring channels.

What is claimed is:

1. A mobile radio communication system which includes a plurality of mobile stations, a plurality of radio base stations which communicate by radio with said plurality of mobile stations using a plurality of channels of different frequencies, and an operation maintenance station for monitoring and controlling an operation situation of said system, in which the same channels can be allocated to a plurality of said radio base stations, wherein each of said radio base stations includes reception electric field strength measurement means for measuring reception electric field strengths of the channels of the radio base station, and said operation maintenance station includes
same channel allocation inhibition discrimination means for discriminating, from installation position information of said radio base stations set in advance and a cluster radius determined from a required desired-to-undesired signal ratio, those radio base stations to which allocation of the same channel as that of a predetermined one of said plurality of radio base stations is to be inhibited, and
usable channel allocation means for allocating a usable channel to the predetermined base station based on reception electric field strengths of the channels measured by the predetermined base station and reception electric field strengths of the channels measured by the radio base stations with which allocation of the same channel is inhibited by said same channel allocation inhibition discrimination means.

2. A mobile radio communication system as claimed in claim 1, wherein said operation maintenance means further includes
speech quality monitoring means for monitoring speech qualities between said mobile terminals and said plurality of radio base stations, and
quality discrimination means for discriminating based on a result of the monitoring of said speech quality monitoring means whether or not there is a radio base station using a channel in which the communication quality is lower than a required quality, and
said usable channel allocation means allocates, to a radio base station discriminated by said quality discrimination means which in using a channel in which the speech quality is lower than the required quality, a channel other than the channel in which the speech quality is lower than the required quality.

3. An automatic frequency allocation method performed in a mobile radio communication system which includes a plurality of mobile stations, a plurality of radio base stations which communicate by radio with said plurality of mobile stations using a plurality of channels of different frequencies, and an operation maintenance station for monitoring and controlling an operation situation of said system and wherein the same channel can be allocated to a plurality of said radio base stations, comprising the steps of:

measuring reception electric field strengths of channels of the radio base station;

discriminating, from installation position information of said radio base stations set in advance and a cluster radius determined from a required desired-to-undesired signal ratio, those radio base stations to which allocation of the same channel as that of a predetermined one of said plurality of radio base stations is to be inhibited; and allocating a usable channel to the predetermined base station based on reception electric field strengths of the channels measured by the predetermined base station and reception electric field strengths of the channels measured by the radio base stations to which allocation of the same channel is inhibited.

4. An automatic frequency allocation method as claimed in claim 3, in which the allocation of the usable channel is performed such that it is confirmed for each of the channels of the predetermined radio base station successively in an ascending order of the electric field strength whether or not the channel is being used by the radio base stations to which allocation of the same channel is inhibited, and that channel which is first confirmed as the channel is not being used is determined as a usable channel.

5. An automatic frequency allocation method performed in a mobile radio communication system which includes a plurality of mobile stations, a plurality of radio base stations which communicate by radio with said plurality of mobile stations using a plurality of channels of different frequencies, and an operation maintenance station for supervising and controlling an operation situation of said system and in which the same channel can be allocated to a plurality of said radio base stations, comprising the steps of:

measuring reception electric field strengths of channels of the radio base station;

discriminating, from installation position information of said radio base stations set in advance and a cluster radius determined from a required desired-to-undesired signal ratio, those radio base stations to which allocation of the same channel as that of a predetermined one of said plurality of radio base stations is to be inhibited;

confirming for each of the channels of the predetermined radio base station successively in an ascending order of the electric field strength whether or not the channel is being used by the radio base stations to which allocation of the same channel is inhibited when a usable channel is allocated to the predetermined base station based on reception of electric field strengths of the channels measured by the radio base stations to which allocation of the same channel is inhibited;

determining as a usable channel the channel which is first confirmed as the channel is not being used;

confirming whether or not the speech quality of radio communication by the allocated channel is lower than required quality; and allowing the one of the other channels which has an electric field strength which is next lower than the allocated channel and which is not currently being used to become the allocated channel if the speech quality of the allocated channel is lower than the required quality.

* * * * *